· US010348741B2

United States Patent
Edmison et al.

(10) Patent No.: US 10,348,741 B2
(45) Date of Patent: Jul. 9, 2019

(54) METHOD AND APPARATUS FOR VIRTUALLY TAPPING NETWORK TRAFFIC USING A VIRTUAL PACKET BROKER

(71) Applicant: ALCATEL-LUCENT CANADA INC., Ottawa (CA)

(72) Inventors: Kelvin R. Edmison, Ottawa (CA); Sami Assaad, Carp (CA)

(73) Assignee: ALCATEL LUCENT, Boulogne Billancourt (FR)

( * ) Notice: Subject to any disclaimer, the term of this patent is extended or adjusted under 35 U.S.C. 154(b) by 0 days.

(21) Appl. No.: 15/591,401

(22) Filed: May 10, 2017

(65) Prior Publication Data

US 2018/0331912 A1 Nov. 15, 2018

(51) Int. Cl.
*H04L 29/06* (2006.01)
*H04L 12/863* (2013.01)
*H04L 12/26* (2006.01)
*H04L 12/803* (2013.01)

(52) U.S. Cl.
CPC ........ *H04L 63/1408* (2013.01); *H04L 43/028* (2013.01); *H04L 43/062* (2013.01); *H04L 43/12* (2013.01); *H04L 47/125* (2013.01); *H04L 47/624* (2013.01); *H04L 63/029* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 6,862,430 B1* | 3/2005 | Duffy | ................... | H04B 7/2606 370/252 |
| 2004/0213284 A1* | 10/2004 | Clarke | ................... | H04L 49/201 370/465 |
| 2008/0291928 A1* | 11/2008 | Tadimeti | ................. | H04L 45/00 370/401 |
| 2010/0254386 A1* | 10/2010 | Salinger | .............. | H04L 12/2801 370/392 |
| 2013/0308648 A1* | 11/2013 | Shamis | ................. | H04L 12/465 370/395.53 |
| 2016/0253192 A1* | 9/2016 | Singaravelu | ........ | G06F 9/45537 718/1 |
| 2017/0041199 A1* | 2/2017 | Rhodes | .................... | H04L 43/18 |
| 2017/0279668 A1* | 9/2017 | Shevenell | ............... | H04L 67/10 |
| 2017/0279723 A1* | 9/2017 | Vedam | .................. | H04L 47/125 |
| 2018/0091432 A1* | 3/2018 | Ma | ....................... | H04L 47/2483 |
| 2018/0159779 A1* | 6/2018 | Williams, Jr. | .......... | H04L 47/20 |

* cited by examiner

*Primary Examiner* — Anh Ngoc M Nguyen
(74) *Attorney, Agent, or Firm* — Kramer Amado, P.C.

(57) ABSTRACT

Various embodiments relate to a method and apparatus for tapping into a virtual network by leveraging a packet broker to deliver a plurality of network packets to an appliance to be analyzed, including receiving, by the packet broker, the plurality of network packets from virtual network interfaces, replicating, by the packet broker, the plurality of network packets, transmitting, by the packet broker, the plurality of network packets to a packet tunnel and transmitting, by the packet tunnel, the plurality of network packets from the packet tunnel to the appliance for processing.

20 Claims, 2 Drawing Sheets

METHOD AND APPARATUS FOR VIRTUALLY TAPPING NETWORK TRAFFIC USING A VIRTUAL PACKET BROKER

TECHNICAL FIELD

This disclosure relates generally to virtually tapping network traffic to monitor and analyze the network traffic being sent through any VNF and/or cloud network by a virtual packet broker, and more specifically, but not exclusively, to replicating network traffic for monitoring and analyzing.

BACKGROUND

Service function chaining is a mechanism for overriding the basic destination based forwarding that is typical of IP networks.

Hypervisor-based taps and network underlay-based packet mirroring are inefficient because they are configured outside of the context of normal Software-Designed Networking ("SDN") and service chain management.

Thus, they are not available to the Virtual Machine ("VM") layers to report metrics that would indicate when capacity levels are reached and/or whether additional resources are needed.

One other existing solution may be to place the vNIDS in-line in the service chain. While this allows for the requisite visibility regarding packet reordering, etc., which is lacking in hypervisor-based taps and network underlay-based packet mirroring, the addition of multiple monitoring elements (common in many network scenarios) introduces unnecessary additional latency in the service chain path.

SUMMARY OF EXEMPLARY EMBODIMENTS

A brief summary of various embodiments is presented below. Embodiments address the need to create a method, which is a virtualized version of an appliance, which analyzes network traffic and leverages packet broker devices to deliver to the appliances a copy of the traffic to be analyzed. This method would allow the vNIDS to analyze the network traffic without being placed in-line with the service chain itself.

In order to overcome these and other shortcomings of the prior art and in light of the present need to create a method, which is a virtualized version of an appliance, which analyzes network traffic and leverages packet broker devices' to deliver to the appliance a copy of the traffic to be analyzed, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments relate to a method for tapping into a virtual network by leveraging a packet broker to deliver a plurality of network packets to an appliance to be analyzed, the method including receiving, by the packet broker, the plurality of network packets from virtual network interfaces, replicating, by the packet broker, the plurality of network packets, transmitting, by the packet broker, the plurality of network packets to a packet tunnel and transmitting, by the packet tunnel, the plurality of network packets from the packet tunnel to the appliance for processing.

In an embodiment of the present disclosure, the method further includes transmitting, by the packet broker, the plurality of network packets from the packet broker through a pass through to a plurality of virtual network interfaces.

In an embodiment of the present disclosure, the plurality of network packets include a header which includes a pointer and a counter which is configured to be incremented when each of the plurality of network packets is replicated for each vCPUs and decremented when each of the plurality of network packets is released by each of the vCPUs.

In an embodiment of the present disclosure, the plurality of network packets are separated into ingress network packets and egress network packets.

In an embodiment of the present disclosure, the packet tunnel includes a plurality of vCPUs which are configured to receive the plurality of network packets and transmit the plurality of network packets to a plurality of virtual network interfaces.

In an embodiment of the present disclosure, the appliance is a plurality of vNIDS.

In an embodiment of the present disclosure, the appliance is configured to analyze performance of the plurality of network packets and analyze the plurality of network packets for malware.

In an embodiment of the present disclosure, the packet tunnel is configured to load balance and filter the plurality of network packets using a hash function.

In an embodiment of the present disclosure, the packet tunnel is configured to determine whether any of the plurality of network packets have been dropped and determine whether reordering of the plurality of network packets is needed.

In an embodiment of the present disclosure, the virtual packet broker is an IMSI based virtual packet broker which includes a load balancing algorithm which is mobile network aware and configured to load balance the plurality of network packets to sensor devices based on the IMSI.

Various embodiments relate to a non-transitory machine-readable storage medium encoded with instructions executable to perform a method by a processor for tapping into a virtual network by leveraging a packet broker to deliver a plurality of network packets to an appliance to be analyzed, the machine-readable storage medium including instructions for receiving, by the packet broker, the plurality of network packets from virtual network interfaces, instructions for replicating, by the packet broker, the plurality of network packets, instructions for transmitting, by the packet broker, the plurality of network packets to a packet tunnel and instructions for transmitting, by the packet tunnel, the plurality of network packets from the packet tunnel to the appliance for processing.

In an embodiment of the present disclosure, the non-transitory machine-readable storage medium, further includes instructions for transmitting, by the packet broker, the plurality of network packets from the packet broker through a pass through to a plurality of virtual network interfaces.

In an embodiment of the present disclosure, the plurality of network packets include a header which includes a pointer and a counter which is configured to be incremented when each of the plurality of network packets is replicated for each vCPUs and decremented when each of the plurality of network packets is released by each of the vCPUs.

In an embodiment of the present disclosure, the plurality of network packets are separated into ingress network packets and egress network packets.

In an embodiment of the present disclosure, the packet tunnel includes a plurality of vCPUs which are configured to receive the plurality of network packets and transmit the plurality of network packets to a plurality of virtual network interfaces.

In an embodiment of the present disclosure, the appliance is a plurality of vNIDS.

In an embodiment of the present disclosure, the appliance is configured to analyze performance of the plurality of network packets and analyze the plurality of network packets for malware.

In an embodiment of the present disclosure, the packet tunnel is configured to load balance and filter the plurality of network packets using a hash function.

In an embodiment of the present disclosure, the packet tunnel is configured to determine whether any of the plurality of network packets have been dropped and determine whether reordering of the plurality of network packets is needed.

In an embodiment of the present disclosure, the virtual packet broker is an international mobile subscriber identity ("IMSI") based virtual packet broker which includes a load balancing algorithm which is mobile network aware and configured to load balance the plurality of network packets to sensor devices based on the IMSI.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
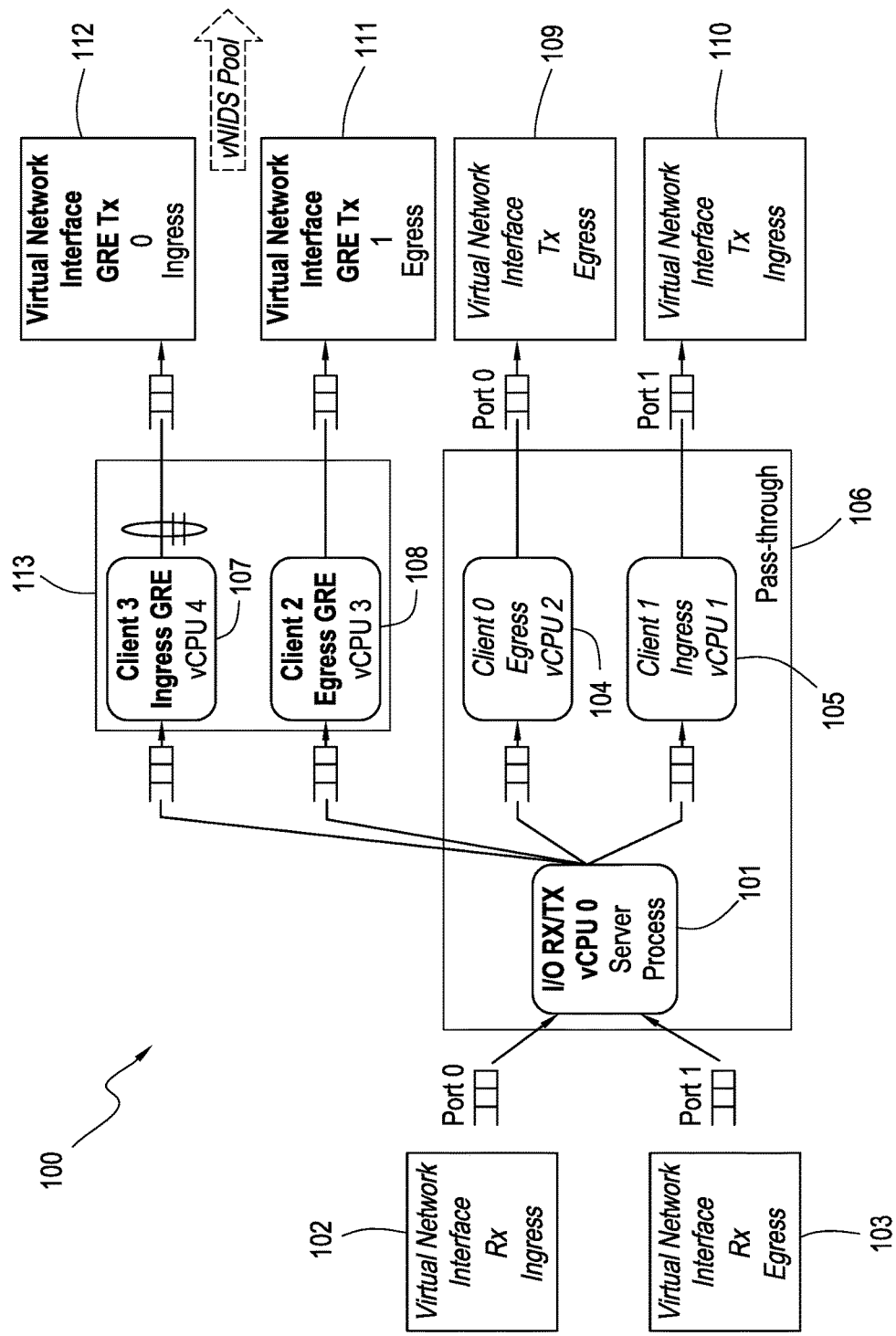
FIG. 1 illustrates a block diagram of a virtual packet broker.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

A method is described, which is a virtualized version of an appliance, which analyzes network traffic and leverages a packet broker to deliver to the appliance a copy of the traffic to be analyzed. This method would allow the vNIDS to analyze the network traffic without being placed in-line with the service chain itself.

Network traffic analysis appliances may analyze mobile network performance and may analyze fixed and mobile networks for signs of malware.

Deployment of these appliances in physical networks leverages the packet broker to deliver to the appliances a copy of the traffic to be analyzed.

This disclosure relates to a virtualized version of these appliances, which are compatible with Network Functional Virtualization ("NFV"), SDN, and service chains.

The Virtual Tap ("vTap") provides visibility into virtual data center network traffic, which are not visible without tapping the network traffic. The vTap allows the port-mirroring of network traffic and forwards it to one or more detectors (i.e., appliances) in the network.

FIG. 1 illustrates a vTap 100 which has a virtual CPU ("vCPU") 0 Server Process 101 which functions as the virtual packet broker. The vCPU 0 101 receives ingress and egress traffic, specifically from virtual network interface Rx Ingress 102 on Port 0 and virtual network interface Rx Egress 103 on Port 1 to the vCPU 0. The vCPU 0 then sends the traffic to the vTAP's four ports.

The vCPU 0 101 may transmit or receive network packets from any number of input or output ports based upon the limitations of the hardware implementing the vCPU.

For example, FIG. 1 illustrates two vCPUs on the pass through 106, Client 0 Egress vCPU 2 104 which may receive traffic from virtual network interface Rx Ingress 102 or virtual network interface Rx Egress 103. FIG. 1 further illustrates another vCPU, Client 1 Ingress vCPU 1 105 which may receive traffic from virtual network interface Rx Ingress 102 or vNIX Rx Egress 103. The pass through 106 is used to pass all traffic through unimpeded.

For example, FIG. 1 illustrates two other vCPUs on the GRE tunnel 113, Client 2 Egress GRE vCPU 3 107 and Client 3 Ingress GRE vCPU 4 108 which may receive a replication of the traffic from vCPU 0 101 and forward each of either ingress or egress port-mirrored traffic to the detectors for processing. For example, the processing may be load balancing, capacity management, scaling, detecting packet loss, reordering, provisioning additional virtual packet broker instances, provisioning additional vNIDS resources and triggering necessary network reconfigurations.

Client 0 104 may pass all traffic through unimpeded through Port 0 to virtual network interface Tx Egress 109, and Client 1 105 may pass all traffic through unimpeded through Port 1 to virtual network interface Tx Ingress 110. Traffic passes through Client 0 104 and Client 1 105 unimpeded, continuously, even if the traffic is being replicated and transmitted to the GRE tunnel.

Client 2 108 may forward either ingress or egress port-mirrored traffic to virtual network interface GRE Tx 1 Egress 111 and Client 3 107 may forward either ingress or egress port-mirrored traffic to virtual network interface GRE Tx 0 Ingress 112.

The traffic from virtual network interface GRE Tx 1 Egress 111 and from virtual network interface GRE Tx 0

Ingress 112 is forwarded to a vNIDS Pool (i.e., applicances), which may include functions such as malware detection, performance analysis, packet dropping analysis, packet reordering analysis, etc.

Client 2 108 and client 3 107 may have a destination MAC address, a source IP address, and a destination IP address which are configurable.

vCPU 0 101 may have a source MAC address which is configurable.

The virtual network interface may be derived from a virtualized network interface card ("vNIC"). The vNIC may be configured through the virtual machine (in a virtualized environment) or part of the Cloud setup (i.e. OpenStack).

In a Cloud, the virtual network interface(s) may be provided to the packet broker and not the entire vNIC.

The packet broker may be able to have its interfaces connect to a vNIC, single route input/output virtualization ("SR-IOV") and other individual virtual network interfaces which support many types of models and devices.

The network packets which are replicated may include a pointer and a counter, where the counter is incremented based on the number of vCPUs are utilizing the network packet and the counter is decremented when the vCPUs are no longer utilizing the network packet, and when the counter is zero, the network packet is no longer in use by the vTAP, and it is released from the memory cache.

The replicated network packets are a mirror for incoming transmitted and received packet streams and may have a different header than the network packet, such as a header for the GRE tunnel. While GRE tunneling is described, other tunneling protocols may be used as well.

The GRE tunnel may feed into another vTAP or a different virtual/physical network function.

The replicated traffic may be load balanced across multiple GRE tunnels.

The load balancing may be performed by a hash function, for example, the Cuckoo hash, from the Data Plane Development Kit ("DPDK").

The hash keys may include IP SRC and DST addresses, TCP/UDP SRC and DST ports, and TCP/UDP protocol identifier.

The GRE tunnel may identify whether the replicated network packets have been received or whether there has been network packet loss in the virtual network between the virtual packet broker (i.e., vTAP) and the appliances (i.e., vNIDS).

Furthermore, each of the replicated network packets may include a sequence number which may be used to determine whether the network packets need to be reordered.

The vTap 100 in FIG. 1 may provide a low-latency, high-performance through-path from one virtual interface to another, where the original traffic on the through-path is mirrored to a specified destination via separate network interface(s), which is bidirectional as the vTAP 100 supports traffic flowing in both directions through the through-path.

The vTap 100 also provides mirroring of the through-path to separate, dedicated virtual interface(s).

The vTap 100 also provides a configurable (i.e., enable/disable) tunnel-based encapsulation (e.g., GRE tunnel) of the packets on the mirror ports.

The vTap 100 may be compatible with a KVM-based hypervisor.

The vTap 100 is a virtual network function ("VNF") in a Network Function Virtualization ("NFV") environment, using a NIC virtual function or pass-through.

The vTap 100 is configured for load balancing across multiple outputs based on inside tunnel packet header fields and may load-balance the traffic to multiple destinations.

vNIDS may be any virtual monitoring application.

The virtual packet broker may be a first-order NFV element in the service chain which performs capacity management and scaling.

The virtual packet broker may be used in any VNF based network. For example, mobile and enterprise networks.

Service chain managers can observe the performance and capacity of both the virtual packet broker and trigger scaling events for it in the context of the entire service chain of the network.

In addition, the virtual packet broker may leverage GRE tunnels directly between the virtual packet broker and the vNIDS. These GRE tunnels are used to inform end points, i.e., the virtual packet broker and the vNIDS, about the presence of packet drops and reordering.

The service chain manager may then observe the status from both endpoints to trigger scaling events such as provisioning additional virtual packet broker instances, provisioning additional vNIDS resources, or both, and trigger the necessary network reconfigurations to place them in service.

A virtual packet broker that is a first-order NFV element may enable different implementations of the virtual packet broker, where load balancing is not on a simple round-robin or flow-based implementation that is commonly found in hypervisor taps or underlay-based packet mirroring.

For example, an IMSI-based virtual packet broker, which includes a load balancing algorithm which is mobile-network-aware and is able to load balance network traffic to sensor devices based on the IMSI of the subscriber and requires a deep analysis of mobile network traffic, combined with persistence of state between upstream and downstream traffic, and therefore cannot be added (i.e., in line) to either an underlay-based approach or a hypervisor tap.

Another example is tunnel protocols in the service chain data plane traffic to perform load balancing or filtering based on IP 5-tuple contained in an inner IP 5-tuple. An example of this would be load balancing on the IP 5-tuple information of a subscriber's traffic in a GTP-U tunnel, or on the inner IP 5-tuple of an IP-IP tunnel.

This example would permit the virtual packet broker to participate in the data plane service chain while launching traffic into a new service chain for the monitoring applications. The virtual packet broker could also act as an M×N tap/switch, sending traffic to more than one service chain supporting monitoring applications.

Another example is a service chain (carrying, for example, mobile traffic in a vEPC scenario). The virtual packet broker is placed in the service chain for the 51-U interface. The virtual packet broker may copy traffic from the 51-U interface onto a GRE tunnel that is marked with packet sequence numbers. The receiving monitoring device may then analyze the sequence numbers in the GRE tunnel from the virtual packet broker to detect packet loss events and may fix and/or identify packets that were received out of the intended order.

Figure 2:
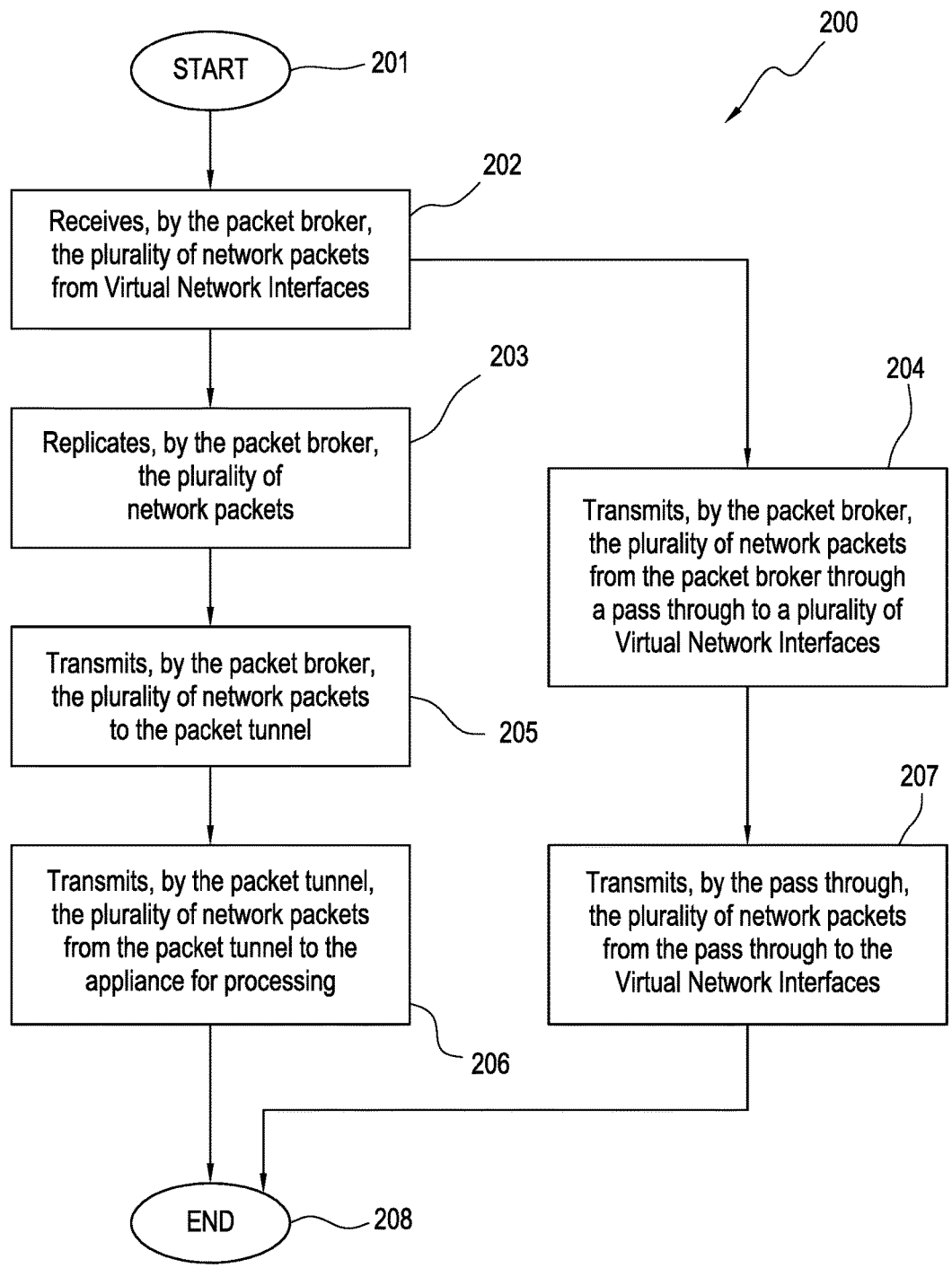
FIG. 2 illustrates a flow chart of a method for tapping into a virtual network by leveraging a packet broker to deliver a plurality of network packets to an appliance to be analyzed.

FIG. 2 illustrates a method 200 for tapping into a virtual network by leveraging a packet broker to deliver a plurality of network packets to an appliance to be analyzed.

The method 200 begins at step 201. The method 200 proceeds to step 202 which receives by the packet broker, the plurality of network packets from virtual network interfaces.

The method 200 then proceeds to either step 203 or step 204. Step 203 replicates, by the packet broker, the plurality of network packets. Step 204 transmits, by the packet broker, the plurality of network packets from the packet broker through a pass through to a plurality of virtual network interfaces.

The method 200 then proceeds from step 203 to step 205 which transmits, by the packet broker, the plurality of network packets to the packet tunnel.

The method 200 proceeds from step 205 to step 206 which transmits, by the packet tunnel, the plurality of network packets from the packet tunnel to the appliance for processing. The method 200 then ends at 208.

The method 200 also proceeds from step 204 to step 207, which transmits, by the pass through, the plurality of network packets from the pass through to the virtual network interfaces. The method 200 then ends at step 208.

Neither approach, hypervisor-based taps nor network underlay-based packet mirroring, provide any visibility to the virtual tap or the Virtual Machine Based Network Intrusion Detection Systems ("vNIDS") about packet drops, reordering, etc. that may be introduced by the network conditions between the virtual tap and the vNIDS.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for tapping into a virtual network by leveraging a packet broker to deliver a plurality of network packets to an appliance to be analyzed, the method comprising:
   receiving, by the packet broker, the plurality of network packets from virtual network interfaces;
   replicating, by the packet broker, the received plurality of network packets;
   transmitting, by the packet broker, the replicated plurality of network packets to a packet tunnel, wherein the replicated plurality of network packets has a different header from the received plurality of network packets and the replicated plurality of network packets includes both a pointer and a counter; and
   transmitting, by the packet tunnel, the replicated plurality of network packets from the packet tunnel to the appliance for processing.

2. The method of claim 1, further comprising:
   transmitting, by the packet broker, the replicated plurality of network packets from the packet broker through a pass through to a plurality of virtual network interfaces.

3. The method of claim 1, wherein the counter is configured to be incremented when each of the replicated plurality of network packets is replicated for each of a plurality of virtual CPUs ("vCPUs") and decremented when each of the plurality of network packets is released by each of the plurality of vCPUs.

4. The method of claim 1, wherein the replicated plurality of network packets are separated into ingress network packets and egress network packets.

5. The method of claim 1, wherein the packet tunnel includes a plurality of vCPUs which are configured to receive the replicated plurality of network packets and transmit the replicated plurality of network packets to a plurality of virtual network interfaces.

6. The method of claim 1, wherein the appliance is a plurality of virtual machine based network intrusion detection systems ("vNIDS").

7. The method of claim 1, wherein the appliance is configured to analyze performance of the replicated plurality of network packets and analyze the replicated plurality of network packets for malware.

8. The method of claim 1, wherein the packet tunnel is configured to load balance and filter the replicated plurality of network packets using a hash function.

9. The method of claim 1, wherein the packet tunnel is configured to determine whether any of the replicated plurality of network packets have been dropped and determine whether reordering of the replicated plurality of network packets is needed.

10. The method of claim 1, wherein a virtual packet broker is an international mobile subscriber identity ("IMSI") based virtual packet broker which includes a load balancing algorithm which is mobile network aware and configured to load balance the replicated plurality of network packets to sensor devices based on the IMSI.

11. A non-transitory machine-readable storage medium encoded with instructions executable to perform a method by a processor for tapping into a virtual network by leveraging a packet broker to deliver a plurality of network packets to an appliance to be analyzed, the machine-readable storage medium comprising:
    instructions for receiving, by the packet broker, the plurality of network packets from virtual network interfaces;
    instructions for replicating, by the packet broker, the received plurality of network packets;
    instructions for transmitting, by the packet broker, the replicated plurality of network packets to a packet tunnel, wherein the replicated plurality of network packets has a different header from the received plurality of network packets and the replicated plurality of network packets includes both a pointer and a counter; and
    instructions for transmitting, by the packet tunnel, the replicated plurality of network packets from the packet tunnel to the appliance for processing.

12. The non-transitory machine-readable storage medium of claim 11, further comprising:
    instructions for transmitting, by the packet broker, the replicated plurality of network packets from the packet broker through a pass through to a plurality of virtual network interfaces.

13. The non-transitory machine-readable storage medium of claim 11, wherein the counter is configured to be incremented when each of the replicated plurality of network packets is replicated for each of a plurality of virtual CPUs ("vCPUs") and decremented when each of the replicated plurality of network packets is released by each of the plurality of vCPUs.

14. The non-transitory machine-readable storage medium of claim 11, wherein the replicated plurality of network packets are separated into ingress network packets and egress network packets.

15. The non-transitory machine-readable storage medium of claim 11, wherein the packet tunnel includes a plurality of vCPUs which are configured to receive the replicated plurality of network packets and transmit the replicated plurality of network packets to a plurality of virtual network interfaces.

16. The non-transitory machine-readable storage medium of claim 11, wherein the appliance is a plurality of virtual machine based network intrusion detection systems ("vNIDS").

17. The non-transitory machine-readable storage medium of claim 11, wherein the appliance is configured to analyze performance of the replicated plurality of network packets and analyze the replicated plurality of network packets for malware.

18. The non-transitory machine-readable storage medium of claim 11, wherein the packet tunnel is configured to load balance and filter the replicated plurality of network packets using a hash function.

19. The non-transitory machine-readable storage medium of claim 11, wherein the packet tunnel is configured to determine whether any of the replicated plurality of network packets have been dropped and determine whether reordering of the replicated plurality of network packets is needed.

20. The non-transitory machine-readable storage medium of claim 11, wherein a virtual packet broker is an international mobile subscriber identity ("IMSI") based virtual packet broker which includes a load balancing algorithm which is mobile network aware and configured to load balance the replicated plurality of network packets to sensor devices based on the IMSI.

* * * * *